US 6,610,340 B1

(12) United States Patent
Henson et al.

(10) Patent No.: US 6,610,340 B1
(45) Date of Patent: Aug. 26, 2003

(54) USE OF WATER-SOLUBLE PHOSPHATES TO CONTROL PSE CONDITION IN MUSCLE PRODUCTS

(75) Inventors: Lulu S. Henson, Plainsboro, NJ (US); Kevin J. Fennewald, Ballwin, MO (US); James W. Lamkey, Yardley, PA (US); David Gerrard, Pine Village, IN (US)

(73) Assignee: Astaris, LLC, Saint Louis, MO (US)

( * ) Notice: Subject to any disclaimer, the term of this patent is extended or adjusted under 35 U.S.C. 154(b) by 340 days.

(21) Appl. No.: 09/678,463

(22) Filed: Oct. 3, 2000

Related U.S. Application Data

(60) Provisional application No. 60/157,828, filed on Oct. 5, 1999.

(51) Int. Cl.⁷ .......................... A23L 1/314; A23L 1/318
(52) U.S. Cl. .................. 426/281; 426/332; 426/641
(58) Field of Search ................... 426/281, 641, 426/332

(56) References Cited

U.S. PATENT DOCUMENTS

| 4,818,548 A | 4/1989 | Cheng ................ 426/265 |
| 5,069,922 A | 12/1991 | Brotsky et al. ........... 426/332 |
| 5,362,507 A | 11/1994 | Ludwig ................ 426/281 |
| 5,714,188 A | 2/1998 | Gilchrist .............. 426/281 |
| 5,989,611 A | 11/1999 | Stemmler, Jr. et al. ..... 426/332 |
| 6,020,012 A | 2/2000 | Kauffman et al. ......... 426/281 |

FOREIGN PATENT DOCUMENTS

| EP | 0 028 113 | 5/1981 |
| EP | 0 209 268 | 1/1987 |
| EP | 0 516 878 | 12/1992 |
| WO | WO 97/46119 | 12/1997 |

*Primary Examiner*—Arthur L. Corbin
(74) *Attorney, Agent, or Firm*—Ahaji K. Amos; Thompson Coburn, LLP

(57) ABSTRACT

A method for controlling PSE (pale, soft, exudative) condition in meat muscle products is disclosed. A phosphate solution is injected into the animal muscle early post-mortem period after slaughter, prior to the onset of rigor mortis in the muscle.

11 Claims, No Drawings

USE OF WATER-SOLUBLE PHOSPHATES TO CONTROL PSE CONDITION IN MUSCLE PRODUCTS

This application claims the benefit of U.S. Provisional Application No. 60/157,828, filed Oct. 5, 1999.

FIELD OF THE INVENTION

This invention relates to a method for improving the properties of fresh meat, especially pork. In particular, this invention relates to the treatment of fresh meat with an aqueous solution of a water-soluble phosphate to prevent PSE condition.

BACKGROUND OF THE INVENTION

PSE (pale, soft, exudative) condition in meat muscle products, especially pork, is a condition in which the muscle product becomes very pale, stiff, and watery, and loses its water holding capacity. PSE muscle products have been reported to have higher evaporative cooking losses, slower cooking rates, and lower juiciness and tenderness than normal muscle products. Muscle product refers to meat products derived primarily from the animal muscle (bovine, porcine, or seafood), such as bacon and ham.

PSE condition is associated with a rapid rate of postmortem glycolysis, producing a pH below 5.4 while the carcass is still at about 36–40° C. The low pH while the muscle temperature is still high causes protein denaturation.

Because most meat products, especially fresh meat products, are purchased based on a visual inspection by the purchaser, abnormal coloration has an adverse effect on the salability of the product. PSE condition produces a tremendous loss in value to pork producers because the loins and hams represent about one-half the market value of the carcass. Over 95 million pigs are slaughtered each year in the United States alone. Estimates put the losses caused by PSE condition at between $50 million to $140 million annually. Reduction or elimination of PSE condition can produce a large economic gain to the meat production and processing industry.

R. G. Kauffman et al., WO 97/46119 and *J. Anim. Sci.*, 76, 3010–3015 (1998), disclose a method for improving the color, water-holding capacity, and organoleptic qualities of meat, especially pork, by injecting or perfusing a solution of sodium bicarbonate into the carcass within 24 hr of slaughter. However, except for the ability of bicarbonates to increase pH, bicarbonates have no known other functional effect on meat proteins. Moreover, excessive alkaline conditions in the meat muscle can contribute to the formation of an undesirable condition known as DFD (dark, firm, dry), as well as contribute to a soapy flavor.

Thus, a need exists for a method for preventing PSE in pork and other muscle products but that does not produce other undesirable effects.

SUMMARY OF THE INVENTION

The introduction of water-soluble phosphates, such as orthophosphates, pyrophosphates, and/or polyphosphates with a chain length greater than 2, into muscle products, particularly porcine muscle, prevents the onset of PSE condition as well as the physicochemical changes associated with PSE. The effective materials include not only the phosphates and mixtures of phosphates, but also mixtures of one or more phosphates with the edible salts of various acids, such as citric acid, lactic acid, acetic acid, malic acid, ascorbic acid, gluconic acid, etc., especially their sodium and potassium salts.

A critical parameter is the uniform introduction of the material in the early post-mortem period after slaughter, prior to the onset of rigor mortis in the muscle. A second critical parameter is use of a material that provides an effective acid neutralizing capacity that can be sustained over the effective shelf life of the muscle product. The third critical parameter is use of an optimum ratio of material and concentrations in the muscle product that satisfies the requirements of the second critical parameter while avoiding formation of DFD condition in the muscle product.

Although this invention has application to porcine muscle, it can be used in any other beef, poultry, lamb, or seafood muscle products, such as turkey breast muscle, which are prone to losing its water holding capacity.

An advantage of this invention is that injection of the solution is not limited to PSE-afflicted carcasses, rather the processor can treat all carcasses without fear that normal carcasses will exhibit DFD condition. There are currently no reliable methods or techniques for measuring the presence of PSE in a carcass immediately post-mortem.

DETAILED DESCRIPTION OF THE INVENTION

Injection or perfusion of an aqueous solution of a material containing one or more water-soluble phosphate salts ("phosphate"), such as a orthophosphate, a pyrophosphate, and/or a polyphosphate with a chain length greater than 2, into an animal carcass in the early postmortem period improves the appearance, water-holding capacity and organoleptic quality of the resulting muscle product. In pork, particularly, the treatment greatly inhibits PSE condition.

In practice, immediately after stunning, bleeding and eviscerating of the animal, the carcass is skinned and defatted and the solution injected into the carcass before the onset of rigor mortis. For storage purposes the carcass is then either chilled at 4° C. or crust chilled at –15° C. until the meat reaches a core temperature of 4° C.

For any carcass treated, the aqueous solution has a concentration of about 0.33 to 5% by weight total phosphate salt or salts, preferably about 0.67 to 4.2% by weight, depending on the desired amount of solution and phosphate perfused or injected into the carcass. For example, if it is desired that the carcass contain 0.4% added phosphate and be injected with 12% of its weight with the solution, a solution containing 3.33% phosphate would be prepared. It is preferred that the carcass contain about 0.1 to about 0.5% by weight added phosphate, preferably about 0.3 to about 0.4% by weight added phosphate. Addition of excess phosphate does not further improve the condition of the carcass and may produce an adverse effect, such as DFD condition in the muscle.

Addition of chloride salts enhances protein solubility, thereby acting synergistically with the added phosphates to improve the water holding properties of the muscle fibers in the carcass. Optionally, sodium chloride may be added to the carcass by dissolving it in the aqueous solution and injecting this solution to the carcass. It is preferred that the carcass contain less than 0.5% added sodium chloride, preferably less than or equal to 0.3% sodium chloride. Potassium chloride may be used in place of sodium chloride.

Preferably, the aqueous solution comprises a material that has a pH (1% by wt. aqueous solution) greater than or equal to 6, more preferably greater than or equal to 7, and most preferably greater than or equal to 8. The material may be a single phosphate salt, a mixture of phosphate salts, or a mixture of one or more phosphate salts with one or more non-phosphate compounds.

The choice of material is also dictated by its neutralizing capacity. Neutralizing capacity measured by the number of milliequivalents of base required to change the pH of 100 mL of a 1% by weight solution of the material (i.e. 1 g of material) from about 5 to about pH 7, or by the number milliequivalents of acid required to change the pH of 100 mL of a 1% by weight solution of the material from about 7 to about pH 5. Higher values are more effective in preventing the onset of PSE. Neutralizing capacity values should preferably be at least 2.4, more preferably at least 3 and most preferably at least 4. Preferably the phosphate is a mixture of orthophosphate and polyphosphate (chain length greater than 2), more preferably tetrasodium pyrophosphate and sodium tripolyphosphate with chain lengths of 2 and 3, respectively. This combination provides optimal neutralizing capacity through the use of the orthophosphate and optimal muscle modification through the use of the polyphosphates.

Other ingredients that may be present in the aqueous solution include curing salts (nitrites or nitrates), sweeteners or bulking agents, (sugar, dextrose, corn syrup solids, corn syrup, maltodextrins, etc.), flavoring agents including liquid smoke and spices, and preservatives. The solution may also comprise a salt of an edible acid, such as citric acid, lactic acid, acetic acid, malic acid, ascorbic acid, gluconic acid, etc., especially a sodium and potassium salt.

Injection of the carcass can be accomplished by any number of commercially available injection devices well known to those skilled in the art of meat processing. A typical device includes a pressurized reservoir that holds the aqueous solution connected by a suitable conduit means to a valve-controlled injector head bearing one or more hollow injector needles.

Injection of the solution into a pork carcass must be accomplished before the onset of rigor mortis, preferably within 45 minutes post-mortem and more preferably within 20 to 30 minutes post-mortem. Poultry (for example, chicken and turkey) carcasses undergo rigor much sooner than pork carcasses and therefore must be injected before 20 minutes, preferably 8 to 10 minutes post-mortem. The solution temperature may range from −2° C. to 40° C., preferably below 10° C., and more preferably below 4.4° C. Preferably the carcass is injected about 10 to 20% of its weight of the solution, more preferably with 10 to 12% of the solution.

Introduction of the solution into intact carcasses on an overhead rail is an advantage, as this minimizes changes to current production methods. This may be achieved by changing the configuration of current brine injection devices that inject the brine at hundreds of points into the muscle. A more uniform distribution of the brine is achieved by using the appropriate injection pressure and tighter needle patterns. Alternatively, injection may be carried by a process similar to current methods by laying the carcass horizontally on a moving conveyor belt and passing it through a manifold of needles. Minor modifications in the injector machine may be required in order to accommodate the size of the carcass.

Alternatively, the solution is perfused into the carcass. In pork, perfusion is preferably performed via the iliac artery. This forces the solution into the pelvic limbs. In poultry, beef, or lamb, the perfusion can be through any major blood vessel that affords perfusion into the majority of meat in the carcass.

The carcass may be tumbled after treatment to afford more nearly uniform distribution of the phosphate solution. Tumbling apparatus is used throughout the meat-processing industry and is well known to those skilled in the art.

In contrast to injection of sodium bicarbonate solutions to prevent PSE condition, (a) phosphates are more stable than sodium bicarbonate in prepared brines; (b) phosphates are already widely used in muscle products, either fresh or precooked, to prevent moisture loss by modifying the properties of the muscle protein; and (c) various phosphates can be mixed to provide the optimum acid neutralizing capacity (buffer capacity) while avoiding formation of a dark firm dry condition in the muscle product.

High Potassium Polyphosphates

Polyphosphates in which the sodium to potassium ratio is 0.5 to 3.8 may be used in addition to, or in place of sodium polyphosphates, especially in applications in which it is desirable to reduce the sodium content of the food, such as in food for individuals who must control their sodium intake.

Preparation of solutions of sodium and potassium polyphosphates by ion exchange is described in Iler, U.S. Pat. No. 2,557,109. Glassy polyphosphate of the following composition:

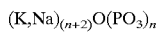

$(K,Na)_{(n+2)}O(PO_3)_n$ in which the ratio of potassium to sodium is about 0.5 to 3.8, preferably 1.0 to 3.8, more preferably 2.4 to 3.6; the average value of n is greater than 9; and at least 85% of the phosphate species comprise more than three phosphate units, may be prepared by the following reaction:

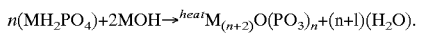

$n(MH_2PO_4)+2MOH \xrightarrow{heat} M_{(n+2)}O(PO_3)_n+(n+1)(H_2O)$.

A mixture of monopotassium phosphate, monosodium phosphate, and potassium and/or sodium hydroxide is prepared. The potassium/sodium ratio of the mixture should be the same ratio that is desired in the glassy poly-phosphate product. Preferably, no ions other than sodium, potassium, the ions derived from phosphate (i.e., $H_2PO_4^-$, $HPO_4^{-2}$, $PO_4^{-3}$), and optionally, hydroxide, are present. If desired, water may also be added to the mixture.

The (K,Na)/P ratio should be between 1.0 and 1.6 and is adjusted for the desired value of n. The smaller the value of this ratio, i.e. the closer this value is to 1.00, the higher the average value of n.

The mixture is placed in a vessel that can withstand the heating conditions, such as a ceramic or alumina vessel, and heated in an appropriate apparatus, such as a muffle furnace. On an industrial scale, the process may be carried out in a bigger furnace, e.g., 8 feet (about 2.4 M) wide by 15 feet (about 4.6 M) long, lined with zircon ramming mix on the bottom designed to withstand a melt temperature of at least 800° C.

The mixture is heated at about 750° C. to drive off water and form a clear melt. Heating below 600° C. produces materials with insufficient long-chain (n>3) phosphate species. Heating at 780° C. produces material that contains excessive insolubles or difficulty-soluble material. Heating should be carried out for about 0.75 to about 1.5 hr. Heating to the required temperature can be carried out in one step or in several stages. After heating, the reaction mixture containing the polyphosphate is, preferably, rapidly cooled so that no crystal growth occurs.

The product is a mixed sodium-potassium polyphosphate glass of formula $(K,Na)_{(n+2)}O(PO_3)_n$, in which n and the ratio of potassium to sodium are as discussed above. The polyphosphate glass contains less than 10% by weight water-insoluble material.

INDUSTRIAL APPLICABILITY

The method of this invention can be used to prevent formation of PSE condition. By the early post-mortem injection of a phosphate solution into an animal carcass, the incidence of PSE condition is reduced or eliminated.

The advantageous properties of this invention can be observed by reference to the following examples, which illustrate, but do not limit, the invention.

EXAMPLES

Example 1

Animals

Forty-five gilts (108–188 kg) were used in this study, which was conducted in three replicates of fifteen animals per replicate. Animals for Replicate 1 were obtained from the Purdue Research Farms (West Lafayette, Ind.). Animals for Replicates 2 and 3 were obtained from the Pig Improvement Co. (PIC). All animals were fed ad libitum prior to slaughter.

Slaughter

Animals were slaughtered at the Purdue University Research and Teaching Laboratory. Each animal was rendered unconscious via electrical stunning. Exsanguination was considered 0-min post-mortem. To accelerate post-mortem pH decline and simulate PSE conditions, each animal was subjected to electrical stimulation (26 pulses, 60 Hz, 450 B, 1 sec off) according to methods of Bowker et al., "Effects of electrical stimulation on early postmortem pH and temperature declines in pigs from different genetic lines and halothane genotypes," Meat Science, 53, 125–133, 1999. Electrical stimulation was delivered through a 16.5 cm long steel electrode placed in the scalder at 5 min post-mortem and processed according to normal slaughter procedures. At about 18 min post-mortem, after carcasses were split and washed, each ham from the left and right carcass halves were removed 5 cm above the aitch bone perpendicular to the shank. Each ham was trimmed to remove all skin and weighed. At approximately 20 min, hams were subjected to predetermined randomly assigned treatments.

Treatments

Five treatments were used. Four treatments were formulated using a mixture of phosphates consisting of 50% disodium phosphate, 35% tetrasodium pyrophosphate, and 15% sodium acid pyrophosphate. The pH of a 1% (wt./wt.) solution of this phosphate mixture is approximately 8. The other treatment was formulated using sodium bicarbonate. Each ham was injected to 110% of the green weight using a multi-stitch injector (Presto Precision Products, Farmingdale, N.Y.) to include 0.2%, 0.3%, 0.4%, or 0.5% phosphate or 0.23% sodium bicarbonate (0.3 M) in the muscle. Phosphate (P) treatments were formulated to include 0.3% sodium chloride in the muscle, whereas the sodium bicarbonate treatment was formulated to include 0.03% sodium chloride. One ham of each carcass was treated with one of the five treatments. The contralateral ham of each carcass was similarly injected with a control solution comprised of dextrose and salt as a control. Control solutions (D) were formulated to have equivalent solids content and salt levels as their respective treatment solutions. All solutions were at 38° C. at the time of injection.

Data Analysis

Differences between each treatment and respective control for pH, temperature, and quality measurements were calculated and analyzed by paired-comparison procedures using the general linear model procedure of Statistical Analysis System Institute Inc, SAS Users Guide to the Statistical Analysis System, North Carolina State Univ., Raleigh, N.C., 1985. No interaction was observed between treatment and muscles and therefore the main effects of muscle and treatment were looked at individually. All comparisons were made at the 0.05 level of probability.

Early Post-mortem Evaluation

In each ham, pH and temperature measurements of the biceps femoris muscle were recorded at 18, 23, 30, 37, 44, 52, and 58 min postmortem. pH measurements were taken using a Beckman φ 110 ISFET pH meter with a spear-tipped potassium chloride gel probe (Fullerton, Calif.), which compensated for temperature differences. The probe was inserted about 5 cm into the biceps femoris muscle at a perpendicular angle to the ham face to ensure measurements were taken in the center of the muscle. Temperature was measured in the same location using VWR Traceable Digital Thermometer (Friendswood, Tex.). At 60 min postmortem hams were placed in a chill cooler (4° C.) for 24 hr.

pH measurements are given in Table 1 and summarized in Table 2. Temperature data is summarized in Table 3.

TABLE 1 pH Measurements of Biceps femoris[a]

| | 1 | | 2 | | 3 | | 4 | | 5 | |
|---|---|---|---|---|---|---|---|---|---|---|
| Time | 0.2% P | 0.2% D | 0.3% P | 0.3% D | 0.4% P | 0.4% D | 0.5% P | 0.5% D | 0.23% SB | 0.23% D |
| 18 min | 6.07 | 6.03 | 6.15 | 6.15 | 6.12 | 6.14 | 6.20 | 6.14 | 6.16 | 6.14 |
| 23 min | 6.68 | 5.90 | 6.92 | 5.91 | 6.94 | 5.92 | 6.94 | 5.91 | 7.12 | 5.99 |
| 30 min | 6.41 | 5.75 | 6.64 | 5.83 | 6.70 | 5.82 | 6.85 | 5.78 | 6.87 | 5.87 |
| 37 min | 6.28 | 5.72 | 6.51 | 5.73 | 6.58 | 5.78 | 6.66 | 5.71 | 6.71 | 5.81 |
| 44 min | 6.15 | 5.70 | 6.32 | 5.71 | 6.45 | 5.72 | 6.53 | 5.70 | 6.54 | 5.73 |
| 52 min | 6.15 | 5.65 | 6.25 | 5.70 | 6.33 | 5.71 | 6.38 | 5.70 | 6.41 | 5.67 |
| 58 min | 6.08 | 5.63 | 6.12 | 5.64 | 6.23 | 5.64 | 6.24 | 5.63 | 6.30 | 5.61 |

[a]p indicates phosphate; SB indicates sodium bicarbonate; D indicates dextrose.

TABLE 2

Summary of pH Data

| Treatment | pH[a] | pH[b] |
|---|---|---|
| 0.2% Phosphate | 6.08 ± 0.09 | 5.63 ± 0.05 |
| 0.3% Phosphate | 6.12 ± 0.03 | 5.64 ± 0.03 |
| 0.4% Phosphate | 6.23 ± 0.03 | 5.64 ± 0.02 |
| 0.5% Phosphate | 6.24 ± 0.09 | 5.63 ± 0.04 |
| 0.23% Sodium Bicarbonate | 6.30 ± 0.04 | 5.61 ± 0.04 |

[a]Treated (P) at 58 minutes
[b]Control (D) at 58 minutes

TABLE 3

Summary of Temperature Data

| Treatment | Temp (° C.)[a] | Temp (° C.)[b] |
|---|---|---|
| 0.2% Phosphate | 37.6 ± 0.4 | 37.9 ± 0.4 |
| 0.3% Phosphate | 37.9 ± 0.3 | 38.5 ± 0.4 |
| 0.4% Phosphate | 37.7 ± 0.3 | 38.4 ± 0.2 |

TABLE 3-continued

Summary of Temperature Data

| Treatment | Temp (° C.)[a] | Temp (° C.)[b] |
|---|---|---|
| 0.5% Phosphate | 37.9 ± 0.3 | 38.0 ± 0.2 |
| 0.23% Sodium Bicarbonate | 38.3 ± 0.3 | 38.5 ± 0.3 |

[1]Treated at 58 minutes
[b]Untreated at 58 minutes

At 24 hr postmortem hams were cross-sectioned into 2.54 cm sections using a band saw at an angle perpendicular to the shank. An additional 1.90 cm section was also cut. From the 2.54 cm thick sections, the biceps femoris, quadriceps, and semimembranosus muscles, were removed for the evaluation of ultimate pH (pHu), CIE L*a*b* color values, thaw loss, cook loss, and Warner-Bratzler shear values. The 1.90 cm section was used for determination of water holding capacity.

Water-holding Capacity

Water-holding capacity was determined using the drip loss method (A. Rasmussen & J. R. Stouffer, "New method for determination of drip loss in pork muscles," Poster proceedings, 42nd International Congress of Meat Science and Technology, Norway, 286–287, 1996). From the biceps femoris, quadriceps, and semimembranosus of the 1.90 cm ham slice, drip loss was estimated from moisture loss of triplicate 7 g core samples placed in sealed plastic tubes at 4° C. Percentage drip loss was calculated as follows:

$$\text{Drip loss (\%)} = \frac{\text{Initial meat wt} - 24 \text{ hr meat wt} \times 100}{\text{Initial meat wt}}$$

Drip loss data is given in Tables 4, 5, and 6.

TABLE 4

Drip Loss Data for Biceps femoris Muscle

| Treatment | Drip Loss | Δ[a] |
|---|---|---|
| 0.2% Phosphate | 4.02 ± 1.13 | 1.35 ± 0.60 |
| 0.3% Phosphate | 2.41 ± 0.72 | 1.71 ± 1.18 |
| 0.4% Phosphate | 1.56 ± 0.36 | 2.54 ± 0.71 |
| 0.5% Phosphate | 3.11 ± 1.24 | 3.79 ± 1.60 |
| 0.23% Sodium Bicarbonate | 4.59 ± 1.10 | 2.27 ± 1.40 |

[a](Control) - (Treated sample)

TABLE 5

Drip Loss Data for Quadriceps Muscle

| Treatment | Drip Loss | Δ[a] |
|---|---|---|
| 0.2% Phosphate | 1.05 ± 0.35 | 2.03 ± 0.82 |
| 0.3% Phosphate | 0.91 ± 0.22 | 2.38 ± 0.59 |
| 0.4% Phosphate | 0.72 ± 0.18 | 1.83 ± 0.55 |
| 0.5% Phosphate | 1.57 ± 0.33 | 2.24 ± 0.63 |
| 0.23% Sodium Bicarbonate | 1.59 ± 0.53 | 2.38 ± 0.64 |

[a](Control) - (Treated sample)

TABLE 6

Drip Loss Data for Semimembranosus Muscle

| Treatment | Drip Loss | Δ[a] |
|---|---|---|
| 0.2% Phosphate | 4.37 ± 0.79 | 4.87 ± 1.29 |
| 0.3% Phosphate | 4.68 ± 1.07 | 4.71 ± 1.10 |
| 0.4% Phosphate | 4.28 ± 1.22 | 4.95 ± 1.46 |
| 0.5% Phosphate | 3.34 ± 0.55 | 6.87 ± 0.44 |
| 0.23% Sodium Bicarbonate | 5.41 ± 0.92 | 4.68 ± 1.36 |

[a](Control) - (Treated sample)

Ultimate pH (pHu)

Ultimate pH (pHu) was determined in the biceps femoris, quadriceps, and semimembranosus muscles using a Beckman φ 110 ISFET pH meter with spear-tipped potassium chloride gel probe. Data is given in Tables 7, 8, and 9.

TABLE 7

Ultimate pH Data for Biceps femoris Muscle

| Treatment | Ultimate pH | Δ[a] |
|---|---|---|
| 0.2% Phosphate | 5.82 ± 0.11 | −0.15 ± 0.05 |
| 0.3% Phosphate | 6.10 ± 0.07 | −0.25 ± 0.03 |
| 0.4% Phosphate | 6.24 ± 0.05 | −0.39 ± 0.04 |
| 0.5% Phosphate | 5.96 ± 0.12 | −0.32 ± 0.07 |
| 0.23% Sodium Bicarbonate | 6.26 ± 0.07 | −0.52 ± 0.08 |

[a](Control) - (Treated sample)

TABLE 8

Ultimate pH Data for Quadriceps Muscle

| Treatment | Ultimate pH | Δ[a] |
|---|---|---|
| 0.2% Phosphate | 6.04 ± 0.09 | −0.11 ± 0.05 |
| 0.3% Phosphate | 6.20 ± 0.09 | −0.14 ± 0.08 |
| 0.4% Phosphate | 6.36 ± 0.11 | −0.39 ± 0.09 |
| 0.5% Phosphate | 6.18 ± 0.12 | −0.27 ± 0.11 |
| 0.23% Sodium Bicarbonate | 6.48 ± 0.20 | −0.55 ± 0.11 |

[a](Control) - (Treated sample)

TABLE 9

Ultimate pH Data for Semimembranosus Muscle

| Treatment | Ultimate pH | Δ[a] |
|---|---|---|
| 0.2% Phosphate | 5.84 ± 0.10 | −0.14 ± 0.05 |
| 0.3% Phosphate | 5.98 ± 0.03 | −0.12 ± 0.06 |
| 0.4% Phosphate | 6.09 ± 0.08 | −0.22 ± 0.07 |
| 0.5% Phosphate | 5.93 ± 0.11 | −0.30 ± 0.06 |
| 0.23% Sodium Bicarbonate | 6.23 ± 0.13 | −0.46 ± 0.14 |

[a](Control) - (Treated sample)

CIE L*, a*, b*

The biceps femoris, quadriceps, and semimembranosus muscles were separated from on of the 2.54 cm ham slices and all fat, bone, and connective tissue were removed. Color measurements were obtained at 3 separate surface locations with a Hunter Lab 45°/0° D25-PC2 Colorimeter (Hunter Associates, Reston, Va.). Values recorded were CIE-L* (lightness), a* (redness), and b* (yellowness). Data is given in Tables 10–15.

TABLE 10

Color Measurements for Biceps femoris Muscle

| Treatment | CIE L* | Δ<sup>a</sup>-L* |
|---|---|---|
| 0.2% Phosphate | 54.4 ± 0.86 | 1.8 ± 1.22 |
| 0.3% Phosphate | 52.4 ± 0.84 | 3.5 ± 1.68 |
| 0.4% Phosphate | 52.6 ± 1.00 | 3.4 ± 0.86 |
| 0.5% Phosphate | 53.2 ± 1.77 | 4.6 ± 1.52 |
| 0.23% Sodium Bicarbonate | 54.4 ± 0.91 | 4.5 ± 1.43 |

[a](Control) - (Treated sample)

TABLE 11

Color Measurements Data for Quadriceps Muscle

| Treatment | CIE L* | Δ[a]-L* |
|---|---|---|
| 0.2% Phosphate | 47.0 ± 1.16 | 2.5 ± 0.79 |
| 0.3% Phosphate | 46.5 ± 0.74 | 3.0 ± 1.53 |
| 0.4% Phosphate | 44.8 ± 1.42 | 5.0 ± 1.45 |
| 0.5% Phosphate | 47.9 ± 0.94 | 3.3 ± 1.24 |
| 0.23% Sodium Bicarbonate | 49.0 ± 1.00 | 4.9 ± 1.22 |

[a](Control) - (Treated sample)

TABLE 12

Color Measurements Data for Semimembranosus Muscle

| Treatment | CIE L* | Δ[a]-L* |
|---|---|---|
| 0.2% Phosphate | 52.0 ± 1.16 | 4.3 ± 1.18 |
| 0.3% Phosphate | 53.2 ± 1.43 | 5.2 ± 1.73 |
| 0.4% Phosphate | 52.6 ± 1.63 | 5.5 ± 1.87 |
| 0.5% Phosphate | 53.6 ± 0.97 | 6.2 ± 0.81 |
| 0.23% Sodium Bicarbonate | 52.8 ± 1.09 | 6.7 ± 1.70 |

[a](Control) - (Treated sample)

TABLE 13

Color Measurements Data for Biceps femoris Muscle

| Treatment | CIE L* | Δ[a]-b* |
|---|---|---|
| 0.2% Phosphate | 13.9 ± 0.73 | 0.7 ± 0.66 |
| 0.3% Phosphate | 11.8 ± 0.80 | 1.5 ± 0.63 |
| 0.4% Phosphate | 12.2 ± 0.39 | 1.9 ± 0.56 |
| 0.5% Phosphate | 13.8 ± 0.94 | 1.0 ± 1.04 |
| 0.23% Sodium Bicarbonate | 13.7 ± 0.45 | 1.0 ± 0.65 |

[a](Control) - (Treated sample)

TABLE 14

Color Measurements Data for Quadriceps Muscle

| Treatment | CIE b* | Δ[a]-b* |
|---|---|---|
| 0.2% Phosphate | 11.7 ± 0.74 | 1.1 ± 0.68 |
| 0.3% Phosphate | 10.0 ± 0.78 | 2.6 ± 0.98 |
| 0.4% Phosphate | 9.7 ± 1.08 | 2.9 ± 1.07 |
| 0.5% Phosphate | 12.5 ± 0.71 | 2.5 ± 1.31 |
| 0.23% Sodium Bicarbonate | 10.7 ± 0.78 | 2.6 ± 0.93 |

[a](Control) - (Treated sample)

TABLE 15

Color Measurements Data for Semimembranosus Muscle

| Treatment | CIE L* | Δ[a]-b* |
|---|---|---|
| 0.2% Phosphate | 14.3 ± 0.99 | 0.6 ± 0.79 |
| 0.3% Phosphate | 12.8 ± 1.05 | 2.6 ± 1.21 |
| 0.4% Phosphate | 12.6 ± 0.93 | 2.8 ± 0.68 |
| 0.5% Phosphate | 14.0 ± 0.76 | 2.5 ± 0.88 |
| 0.23% Sodium Bicarbonate | 14.3 ± 0.69 | 1.8 ± 1.24 |

[a](Control) - (Treated sample)

Thaw Loss

From a 2.54 cm ham slice, biceps femoris, quadriceps, and semimembranosus muscles were excised and all fat, bone, and connective tissue removed. Each muscle was weighted (initial wt) and individually vacuum packaged in a nylon/polyethylene bag. Muscle samples were stored at −20° C. until further analysis. Muscles were removed from the freezer, tempered under refrigeration (4° C.) for 48 hr and reweighed (thaw wt). Thaw loss percentage was calculated as follows:

$$\text{Thaw loss } (\%) = \frac{\text{Initial meat wt} - \text{Thaw meat wt} \times 100}{\text{Initial meat wt}}$$

Thaw loss data is given in Tables 16–18.

TABLE 16

Thaw Loss Measurements Data for Biceps femoris Muscle

| Treatment | Thaw Loss | Δ[a] |
|---|---|---|
| 0.2% Phosphate | 13.43 ± 1.28 | 2.91 ± 1.75 |
| 0.3% Phosphate | 11.53 ± 1.11 | 3.80 ± 1.39 |
| 0.4% Phosphate | 8.03 ± 0.89 | 6.40 ± 0.93 |
| 0.5% Phosphate | 10.81 ± 1.61 | 5.88 ± 1.17 |
| 0.23% Sodium Bicarbonate | 15.42 ± 0.80 | 3.53 ± 0.75 |

[a](Control) - (Treated sample)

TABLE 17

Thaw Loss Measurements Data for Quadriceps Muscle

| Treatment | Thaw Loss | Δ[a] |
|---|---|---|
| 0.2% Phosphate | 8.30 ± 0.69 | 2.08 ± 1.33 |
| 0.3% Phosphate | 6.24 ± 0.66 | 5.76 ± 1.86 |
| 0.4% Phosphate | 5.28 ± 0.60 | 4.26 ± 0.51 |
| 0.5% Phosphate | 5.34 ± 0.33 | 5.36 ± 0.66 |
| 0.23% Sodium Bicarbonate | 9.20 ± 0.62 | 3.32 ± 1.11 |

[a](Control) - (Treated sample)

TABLE 18

Thaw Loss Measurements Data for Semimembranosus Muscle

| Treatment | Thaw Loss | Δ[a] |
|---|---|---|
| 0.2% Phosphate | 12.30 ± 1.19 | 2.86 ± 0.80 |
| 0.3% Phosphate | 10.90 ± 0.83 | 2.65 ± 0.80 |
| 0.4% Phosphate | 7.71 ± 0.97 | 4.49 ± 1.19 |
| 0.5% Phosphate | 8.74 ± 1.24 | 6.22 ± 1.09 |
| 0.23% Sodium Bicarbonate | 13.02 ± 0.88 | 5.72 ± 0.93 |

[a](Control) - (Treated sample)

Cooking Procedure

Thawed samples were broiled in a General Electric domestic oven to an internal temperature of 71.1° C. The temperature was monitored using a handheld VWR Traceable Digital Thermometer. Muscles were blotted dry, weighed (cooked wt), and cooking loss was determined as:

$$\text{Cooking loss } (\%) = \frac{\text{Thaw meat wt} - \text{Cooked meat wt} \times 100}{\text{Cooked meat wt}}$$

Data is given in Tables 19–21.

TABLE 19

Cooking Loss Measurements for Biceps femoris Muscle

| Treatment | Loss | Δ[a] |
|---|---|---|
| 0.2% Phosphate | 33.91 ± 2.01 | 4.51 ± 1.84 |
| 0.3% Phosphate | 33.97 ± 2.87 | 3.77 ± 1.34 |
| 0.4% Phosphate | 28.81 ± 2.82 | 8.33 ± 1.45 |
| 0.5% Phosphate | 30.23 ± 1.56 | 7.46 ± 1.75 |
| 0.23% Sodium Bicarbonate | 37.52 ± 3.21 | 3.55 ± 0.82 |

[a](Treated sample) - (control)

TABLE 20

Cooking Loss Measurements Data for Quadriceps Muscle

| Treatment | Loss | Δ[a] |
|---|---|---|
| 0.2% Phosphate | 31.89 ± 1.16 | 3.43 ± 1.65 |
| 0.3% Phosphate | 32.13 ± 2.57 | 6.21 ± 1.63 |
| 0.4% Phosphate | 28.76 ± 1.83 | 5.68 ± 1.09 |
| 0.5% Phosphate | 28.22 ± 1.76 | 7.99 ± 1.03 |
| 0.23% Sodium Bicarbonate | 35.13 ± 2.17 | 2.66 ± 1.23 |

[a](Control) - (Treated sample)

TABLE 21

Cooking Loss Measurements Data for Semimembranosus Muscle

| Treatment | Loss | Δ[a] |
|---|---|---|
| 0.2% Phosphate | 31.58 ± 2.08 | 3.30 ± 1.09 |
| 0.3% Phosphate | 33.90 ± 2.31 | 3.48 ± 1.71 |
| 0.4% Phosphate | 31.29 ± 1.60 | 1.69 ± 1.97 |
| 0.5% Phosphate | 28.66 ± 1.52 | 5.84 ± 1.68 |
| 0.23% Sodium Bicarbonate | 36.35 ± 2.60 | 4.54 ± 1.47 |

[a](Control) - (Treated sample)

Warner-Bratzler Shear Force

Cooked muscles were allowed to cool to room temperature (25° C.) and three 1.27 cm (½ inch) cylindrical core samples were obtained. A Warner-Bratzler shear cell attachment on a Q-Test Universal Testing Model III (MTS Systems, Raleigh, N.C.), equipped with a 100 lb (about 45.5 kg) load cell, was used to shear test samples. All samples were sheared perpendicular to the length of the muscle fibers. Crosshead speed was set at 5 cm/min. Data are reported as maximum force tension (kg). Data is given in Tables 22–24.

TABLE 22

Shear Force Measurements for Biceps femoris Muscle

| Treatment | Shear force (kg) | Δ[a] |
|---|---|---|
| 0.2% Phosphate | 3.14 ± 0.15 | 0.62 ± 0.12 |
| 0.3% Phosphate | 2.91 ± 0.04 | 0.51 ± 0.14 |
| 0.4% Phosphate | 2.61 ± 0.11 | 0.72 ± 0.18 |
| 0.5% Phosphate | 2.85 ± 0.19 | 0.63 ± 0.18 |
| 0.23% Sodium Bicarbonate | 3.17 ± 0.13 | 0.40 ± 0.15 |

[a](Control) - (Treated sample)

TABLE 23

Shear Force Measurements Data for Quadriceps Muscle

| Treatment | Shear force (kg) | Δ[a] |
|---|---|---|
| 0.2% Phosphate | 2.26 ± 0.14 | 0.79 ± 0.15 |
| 0.3% Phosphate | 2.35 ± 0.16 | 0.86 ± 0.12 |
| 0.4% Phosphate | 1.75 ± 0.07 | 0.82 ± 0.19 |
| 0.5% Phosphate | 2.08 ± 0.22 | 0.70 ± 0.12 |
| 0.23% Sodium Bicarbonate | 2.40 ± 0.16 | 0.32 ± 0.20 |

[a](Control) - (Treated sample)

TABLE 24

Shear Force Measurements Data for Semimembranosus Muscle

| Treatment | Shear force (kg) | Δ[a] |
|---|---|---|
| 0.2% Phosphate | 2.76 ± 0.13 | 0.82 ± 0.28 |
| 0.3% Phosphate | 2.60 ± 0.16 | 0.60 ± 0.24 |
| 0.4% Phosphate | 2.54 ± 0.14 | 0.54 ± 0.21 |
| 0.5% Phosphate | 2.62 ± 0.15 | 0.42 ± 0.31 |
| 0.23% Sodium Bicarbonate | 2.86 ± 0.11 | 0.38 ± 0.16 |

[a](Control) - (Treated sample)

Example 2

Experiments were conducted to compare the efficacy of different phosphate combinations. Three different phosphate mixtures were compared. Phosphate Mixture I was similar to that used in the previous examples. Phosphate Mixture 2 consisted of 80% sodium tripolyphosphate and 20% sodium acid pyrophosphate. Phosphate Mixture 3 consisted of 96% disodium phosphate and 4% monosodium phosphate. Each mixture had a pH of about 8 (1% by weight solution). Methods used were similar to the examples previously described. In addition, the effect of Phosphate Mixture 1 on non-electrically stimulated animal was evaluated. This represented normal non-PSE afflicted muscle. Each ham was injected to 110% of the green weight using a multi-stitch injector (Presto Precision Products, Farmingdale, N.Y.) to include 0.4% phosphate. Treatments were formulated to include 0.3% sodium chloride in the muscle. One ham of each carcass was treated with one of the four treatments. The contralateral ham of each carcass was similarly injected with a control solution comprised of dextrose and salt as a control. Control solutions were formulated to have equivalent solids content and salt levels as their respective treatment solutions. All solutions were at 38° C. at the time of injection.

Early Post-mortem Evaluation

In each ham, pH and temperature measurements of the Biceps femoris muscle were recorded at 18, 23, 30, 37, 44, 52, and 58 min postmortem. Data for pH are presented in Table 25 and summarized in Table 26. Data for temperature are presented in Table 27.

TABLE 25 pH Measurements of Biceps femoris[a]

| | 0.4% D PB-1 (ES) | 0.4% PB-1 (ES) | 0.4% D PB-1 (NS) | 0.4% PB-1 (NS) | 0.4% D PB-2 | 0.4% PB-2 | 0.4% D PB-3 | 0.4% PB-3 |
|---|---|---|---|---|---|---|---|---|
| 18 min | 6.02 ± 0.03 | 6.05 ± 0.03 | 6.49 ± 0.04 | 6.47 ± 0.04 | 6.09 ± 0.05 | 6.08 ± 0.04 | 6.03 ± 0.05 | 6.05 ± 0.06 |
| 23 min | 5.94 ± 0.02 | 6.96 ± 0.03 | 6.42 ± 0.03 | 7.28 ± 0.06 | 6.02 ± 0.05 | 6.87 ± 0.04 | 6.01 ± 0.04 | 7.56 ± 0.04 |
| 30 min | 5.81 ± 0.05 | 6.62 ± 0.05 | 6.35 ± 0.07 | 6.87 ± 0.09 | 5.89 ± 0.04 | 6.58 ± 0.09 | 5.91 ± 0.06 | 7.27 ± 0.10 |
| 37 min | 5.78 ± 0.03 | 6.48 ± 0.08 | 6.26 ± 0.08 | 6.61 ± 0.07 | 5.78 ± 0.04 | 6.43 ± 0.06 | 5.83 ± 0.04 | 6.85 ± 0.05 |
| 44 min | 5.73 ± 0.02 | 6.29 ± 0.02 | 6.17 ± 0.09 | 6.51 ± 0.09 | 5.71 ± 0.04 | 6.26 ± 0.08 | 5.78 ± 0.01 | 6.68 ± 0.03 |
| 52 min | 5.71 ± 0.01 | 6.25 ± 0.04 | 6.12 ± 0.05 | 6.39 ± 0.05 | 5.71 ± 0.03 | 6.17 ± 0.04 | 5.73 ± 0.02 | 6.46 ± 0.03 |
| 58 min | 5.72 ± 0.01 | 6.10 ± 0.03 | 6.03 ± 0.04 | 6.29 ± 0.04 | 5.68 ± 0.03 | 6.06 ± 0.04 | 5.70 ± 0.03 | 6.29 ± 0.02 |

[a]ES indicates Electrically stimulated; NS indicates Non-electrically stimulated; PB-1 indicates Phosphate Mixture 1; PB-2 indicates Phosphate Mixture 2; PB-3 indicates Phosphate Mixture 3; D indicates Dextrose.

TABLE 26

Summary of pH Data

| Treatment | pH[a] | pH[b] |
|---|---|---|
| Phosphate Mixture 1 ES | 6.10 ± 0.03 | 5.72 ± 0.01 |
| Phosphate Mixture 1 NS | 6.29 ± 0.04 | 6.03 ± 0.04 |
| Phosphate Mixture 2 ES | 6.06 ± 0.04 | 5.68 ± 0.03 |
| Phosphate Mixture 3 ES | 6.29 ± 0.02 | 5.70 ± 0.03 |

[a]Treated (P) at 58 minutes
[b]Control (D) at 58 minutes

TABLE 27

Summary of Temperature Data

| Treatment | Temp (° C.)[a] | Temp (° C.)[b] |
|---|---|---|
| Phosphate Mixture 1 ES | 38.3 ± 0.39 | 38.3 ± 0.34 |
| Phosphate Mixture 1 NS | 37.9 ± 0.23 | 6.03 ± 0.11 |
| Phosphate Mixture 2 ES | 38.6 ± 0.62 | 39.2 ± 0.29 |
| Phosphate Mixture 3 ES | 38.7 ± 0.29 | 39.1 ± 0.36 |

[a]Treated (P) at 58 minutes
[b]Control (D) at 58 minutes

Twenty-Four Hour Evaluation

The evaluation of ultimate pH (pHu), CIE L*a*b* color values, drip loss, thaw loss, cook loss and Warner-Bratzler shear values were conducted at 24 hr postmortem as described above. These data are presented in the following tables. Drip loss data are shown in Table 28 to Table 30.

TABLE 28

Drip Loss Data for Biceps femoris Muscle

| Treatment | Drip Loss | Δ[a] |
|---|---|---|
| Phosphate Mixture 1 ES | 4.58 ± 1.10 | 4.68 ± 1.21 |
| Phosphate Mixture 1 NS | 1.29 ± 0.29 | 3.30 ± 1.26 |
| Phosphate Mixture 2 ES | 2.41 ± 0.64 | 2.16 ± 0.75 |
| Phosphate Mixture 3 ES | 1.60 ± 0.52 | 3.75 ± 1.82 |

[a](Control) - (Treated sample)

TABLE 29

Drip Loss Data for Quadriceps Muscle

| Treatment | Drip Loss | Δ[a] |
|---|---|---|
| Phosphate Mixture 1 ES | 1.75 ± 0.66 | 2.20 ± 0.68 |
| Phosphate Mixture 1 NS | 0.93 ± 0.17 | 1.73 ± 1.00 |
| Phosphate Mixture 2 ES | 0.68 ± 0.11 | 1.15 ± 0.54 |
| Phosphate Mixture 3 ES | 0.47 ± 0.05 | 1.75 ± 0.71 |

[a](Control) - (Treated sample)

TABLE 30

Drip Loss Data for Semimembranosus Muscle

| Treatment | Drip Loss | Δ[a] |
|---|---|---|
| Phosphate Mixture 1 ES | 1.98 ± 0.61 | 3.13 ± 1.24 |
| Phosphate Mixture 1 NS | 1.27 ± 0.24 | 3.11 ± 1.31 |
| Phosphate Mixture 2 ES | 3.15 ± 0.38 | 7.43 ± 0.63 |
| Phosphate Mixture 3 ES | 5.15 ± 1.09 | 6.57 ± 1.21 |

[a](Control) - (Treated sample)

Shear force measurements are presented in Table 31 to Table 33.

TABLE 31

Shear Force Measurements for Biceps femoris Muscle

| Treatment | Shear Force (kg) | Δ[a] |
|---|---|---|
| Phosphate Mixture 1 ES | 2.92 ± 0.14 | 0.46 ± 0.27 |

TABLE 31-continued

Shear Force Measurements for Biceps femoris Muscle

| Treatment | Shear Force (kg) | Δ[a] |
|---|---|---|
| Phosphate Mixture 1 NS | 2.63 ± 0.23 | 0.37 ± 0.30 |
| Phosphate Mixture 2 ES | 3.44 ± 0.24 | 0.27 ± 0.09 |
| Phosphate Mixture 3 ES | 3.18 ± 0.15 | 0.16 ± 0.16 |

[a](Control) - (Treated sample)

TABLE 32

Shear Force Measurements for Quadriceps Muscle

| Treatment | Shear Force (kg) | Δ[a] |
|---|---|---|
| Phosphate Mixture 1 ES | 2.04 ± 0.19 | 0.63 ± 0.16 |
| Phosphate Mixture 1 NS | 2.19 ± 0.44 | 0.23 ± 0.29 |
| Phosphate Mixture 2 ES | 1.92 ± 0.15 | 1.67 ± 0.42 |
| Phosphate Mixture 3 ES | 2.17 ± 0.16 | 0.87 ± 0.16 |

[a](Control) - (Treated sample)

TABLE 33

Shear Force Measurements for Semimembranosus Muscle

| Treatment | Shear Force (kg) | Δ[a] |
|---|---|---|
| Phosphate Mixture 1 ES | 1.89 ± 0.12 | 0.55 ± 0.22 |
| Phosphate Mixture 1 NS | 2.27 ± 0.39 | 0.36 ± 0.29 |
| Phosphate Mixture 2 ES | 2.66 ± 0.30 | 0.72 ± 0.33 |
| Phosphate Mixture 3 ES | 3.12 ± 0.39 | 0.20 ± 0.38 |

[a](Control) - (Treated sample)

Cooking loss measurements are presented in Table 34 to Table 36.

TABLE 34

Cooking Loss Measurements for Biceps femoris Muscle

| Treatment | Loss (%) | Δ[a] |
|---|---|---|
| Phosphate Mixture 1 ES | 39.86 ± 2.07 | 5.92 ± 4.72 |
| Phosphate Mixture 1 NS | 35.88 ± 1.65 | 8.44 ± 3.52 |
| Phosphate Mixture 2 ES | 40.18 ± 1.82 | 5.10 ± 2.45 |
| Phosphate Mixture 3 ES | 40.38 ± 1.41 | 5.74 ± 5.64 |

[a](Control) - (Treated sample)

TABLE 35

Cooking Loss Measurements for Quadriceps Muscle

| Treatment | Loss (%) | Δ[a] |
|---|---|---|
| Phosphate Mixture 1 ES | 34.52 ± 2.03 | 8.95 ± 5.22 |
| Phosphate Mixture 1 NS | 33.88 ± 1.06 | 7.59 ± 4.54 |
| Phosphate Mixture 2 ES | 36.08 ± 0.92 | 6.62 ± 4.47 |
| Phosphate Mixture 3 ES | 36.89 ± 0.93 | 1.81 ± 2.44 |

[a](Control) - (Treated sample)

TABLE 36

Cooking Loss Measurements for Semimembranosus Muscle

| Treatment | Loss (%) | Δ[a] |
|---|---|---|
| Phosphate Mixture 1 ES | 37.74 ± 2.67 | 7.09 ± 4.41 |
| Phosphate Mixture 1 NS | 36.94 ± 1.48 | 8.41 ± 5.13 |
| Phosphate Mixture 2 ES | 44.01 ± 2.07 | 1.50 ± 3.28 |
| Phosphate Mixture 3 ES | 44.61 ± 3.96 | −3.62 ± 20.12 |

[a](Control) - (Treated sample)

Thaw loss values are presented in Table 37 to Table 39.

TABLE 37

Thaw Loss Measurements for Biceps femoris Muscle

| Treatment | Loss (%) | Δ[a] |
|---|---|---|
| Phosphate Mixture 1 ES | 11.23 ± 1.86 | 3.90 ± 4.09 |
| Phosphate Mixture 1 NS | 8.14 ± 0.76 | 5.62 ± 2.34 |
| Phosphate Mixture 2 ES | 8.51 ± 0.87 | 6.66 ± 1.95 |
| Phosphate Mixture 3 ES | 9.12 ± 1.32 | 5.48 ± 5.38 |

[a](Control) - (Treated sample)

TABLE 38

Thaw Loss Measurements for Quadriceps Muscle

| Treatment | Loss (%) | Δ[a] |
|---|---|---|
| Phosphate Mixture 1 ES | 5.37 ± 1.14 | 5.59 ± 3.46 |
| Phosphate Mixture 1 NS | 3.72 ± 1.06 | 5.66 ± 2.94 |
| Phosphate Mixture 2 ES | 4.14 ± 0.86 | 3.47 ± 2.29 |
| Phosphate Mixture 3 ES | 4.00 ± 0.70 | 2.51 ± 1.38 |

[a](Control) - (Treated sample)

TABLE 39

Thaw Loss Measurements for Semimembranosus Muscle

| Treatment | Loss (%) | Δ[a] |
|---|---|---|
| Phosphate Mixture 1 ES | 13.39 ± 1.74 | 4.67 ± 4.52 |
| Phosphate Mixture 1 NS | 7.13 ± 0.47 | 7.64 ± 1.90 |
| Phosphate Mixture 2 ES | 8.83 ± 0.90 | 4.97 ± 1.38 |
| Phosphate Mixture 3 ES | 11.03 ± 0.90 | 3.07 ± 2.54 |

[a](Control) - (Treated sample)

Color measurement data are presented in Table 40 to Table 42.

TABLE 40

Color Measurements Data for Biceps femoris Muscle

| Treatment | CIE L* | Δ[a] |
|---|---|---|
| Phosphate Mixture 1 ES | 54.8 ± 1.45 | 1.58 ± 1.76 |
| Phosphate Mixture 1 NS | 51.6 ± 1.58 | 0.86 ± 4.11 |
| Phosphate Mixture 2 ES | 52.2 ± 0.87 | 4.08 ± 1.44 |
| Phosphate Mixture 3 ES | 53.0 ± 0.76 | 1.02 ± 4.07 |

[a](Control) - (Treated sample)

TABLE 41

Color Measurements Data for Quadriceps Muscle

| Treatment | CIE L* | Δ$^a$ |
|---|---|---|
| Phosphate Mixture 1 ES | 44.6 ± 1.52 | 7.50 ± 5.38 |
| Phosphate Mixture 1 NS | 48.3 ± 1.20 | 0.96 ± 3.29 |
| Phosphate Mixture 2 ES | 47.9 ± 1.16 | 2.06 ± 3.43 |
| Phosphate Mixture 3 ES | 43.7 ± 0.44 | 5.14 ± 6.37 |

$^a$(Control) - (Treated sample)

TABLE 42

Color Measurements Data for Semimembranosus Muscle

| Treatment | CIE L* | Δ$^a$ |
|---|---|---|
| Phosphate Mixture 1 ES | 54.5 ± 1.05 | 2.98 ± 3.44 |
| Phosphate Mixture 1 NS | 50.7 ± 2.20 | 3.32 ± 3.53 |
| Phosphate Mixture 2 ES | 50.5 ± 2.21 | 6.98 ± 4.69 |
| Phosphate Mixture 3 ES | 51.5 ± 0.99 | 5.48 ± 3.71 |

$^a$(Control) - (Treated sample)

Example 3

Various compounds were evaluated for their ability to provide an adequate neutralizing capacity within the pH range deemed to be critical for preventing the onset of the PSE condition in the animal muscle. A 1% (by weight) aqueous solution of the compound or mixture of compounds was prepared (i.e. 1 g in 100 mL of water). If the pH was 5, the solution was titrated to pH 7 with base. If the pH was 7, the solution was titrated to pH 5 with acid. If the pH was 6, the pH was adjusted to pH 5 with acid and titrated to pH 7 with base. Standardized solutions of sodium hydroxide and hydrochloric acid were used as the acid and base, respectively. The milliequivalents of acid required to change the pH of the solution from about pH 7 to about pH 5, or base required to change the pH from about pH 5 to about pH 7, were calculated and presented in Table 43. Higher neutralizing capacity values are more effective in preventing the onset of PSE.

TABLE 43

Neutralizing Capacity of Various Compounds and Mixtures Between pH 5 and pH 7

| Compound or mixture | PH (1% solution) | Neutralizing Capacity$^a$ |
|---|---|---|
| 50% Sodium tripolyphosphate + 30% Sodium acid pyrophosphate + 20% Sodium hexametaphosphate | 7.3 | 2.9 |
| 50% Disodium phosphate + 30% Monsodium phosphate + 20% Sodium hexametaphosphate | 7.0 | 5.0 |
| 14% Disodium phosphate + 66% Monsodium phosphate + 20% Sodium hexametaphosphate | 6.1 | 4.4 |
| 50% Disodium phosphate + 35% Sodium acid pyrophosphate + 15% Tetrasodium pyrophosphate | 7.0 | 4.5 |
| 50% Disodium phosphate + 15% Sodium acid pyrophosphate + 35% Tetrasodium pyrophosphate | 8.0 | 4.6 |
| 50% Disodium phosphate + 50% Sodium bicarbonate | 8.3 | 6.8 |
| 50% Disodium phosphate + 50% Tetrasodium pyrophosphate | 9.8 | 3.5 |
| 50% Disodium phosphate + 40% Tetrasodium pyrophosphate + 10% Sodium bicarbonate | 9.2 | 4.5 |
| 60% Disodium phosphate + 40% Potassium sorbate | 8.7 | 3.4 |
| 60% Disodium phosphate + 40% Sodium benzoate | 8.8 | 2.5 |
| 60% Disodium phosphate + 40% Potassium citrate | 8.8 | 3.5 |
| 60% Disodium phosphate + 40% Sodium citrate | 8.7 | 3.6 |
| Sodium tripolyphosphate | 9.5–10 | 2.4 |
| Tetrasodium pyrophosphate | 10.4 | 3.7 |
| Sodium hexametaphosphate (average chain lengths 6–21) | 6–8 | 0.7–2.3 |
| Disodium phosphate | 9.1 | 8.1 |
| Trisodium phosphate | ~12 | 3.8 |
| Sodium Bicarbonate | 8.3 | 14.1 |
| 17.5% Disodium phosphate + 82.5% Monosodium phosphate | 6.1 | 6 |
| 62.5% Disodium phosphate + 37.5% Monosodium phosphate | 7 | 4.7 |
| 80% Sodium tripolyphosphate + 20% Sodium acid pyrophosphate | 8 | 2.7 |
| 96% Disodium phosphate + 4% Monosodium phosphate | 8 | 4.4 |

$^a$Milliequivalents of acid required to change the pH of a 1% by weight solution from about pH 7 to about pH 5.

From the information in Table 43, a material (compound or mixture) that can effectively neutralize the acidity of a muscle afflicted with PSE can be selected. In choosing the appropriate material, materials that comprise a polyphosphate are preferred to further enhance the processing attributes of the muscle, specifically those related to the ability of the muscle to retain moisture after freezing and cooking. Although certain compounds such as alkaline orthophosphates, hydroxides, or bicarbonates may adequately address the acid neutralization requirement, they do not provide additional functionality to the muscle.

Example 4

Experiments were conducted to determine the amount of acid that must be neutralized in a pork loin muscle in order to keep the muscle at a pH of 7. Two pork loins, each of which had a pH of 5.3, were used. Fifteen grams of the pork loin was homogenized with 15 mL of deionized water, centrifuged, and the supernatant collected. The supernatant was titrated with 0.1 N sodium hydroxide to a pH 7. The results are presented in Table 44.

TABLE 44

Neutralizing Requirement for Pork Loin Muscle

| Pork Loin | Replication | Initial pH | Milliequivalents base to pH 7 per 100 gram of muscle |
|---|---|---|---|
| 1 | 1 | 5.37 | 3.47 |
| 1 | 2 | 5.38 | 3.20 |
| 2 | 1 | 5.37 | 2.93 |
| 2 | 2 | 5.36 | 3.40 |
| 2 | 3 | 5.37 | 3.67 |

Having described the invention, we now claim the following and their equivalents.

What is claimed is:

1. A method for controlling PSE condition in porcine muscle products, the method comprising introducing an aqueous solution into a porcine carcass;
   wherein:
   the solution is introduced into the animal carcass in the early post-mortem stage;
   the solution consists essentially of a material with a neutralizing capacity of at least 2.4 and, optionally, a chloride salt;
   the material consists essentially of at least one water-soluble phosphate;
   a 1% aqueous solution of the material has a pH of at least 6; and
   after addition, the carcass comprises about 0.1% to 0.5% by weight added phosphate.

2. The method of claim 1 in which the porcine muscle product is pork.

3. The method of claim 1 in which the material has a neutralizing capacity of at least 3.

4. The method of claim 1 in which, after addition, the carcass comprises about 0.3% to about 0.4% by weight added phosphate.

5. The method of claim 1 in which the material comprises a polyphosphate.

6. The method of claim 5 in which, after addition, the carcass comprises about 0.3% to about 0.4% by weight added phosphate.

7. The method of claim 6 in which the water-soluble phosphate is a mixture of tetrasodium pyrophosphate and sodium tripolyphosphate.

8. The method of claim 7 in which the porcine muscle product is pork.

9. The method of claim 1 in which the water-soluble phosphate is a mixture of orthophosphate and polyphosphate.

10. A method as set forth in claim 1 wherein the solution further comprises a chloride salt.

11. A method as set forth in claim 1 wherein the solution is free of a chloride salt.

* * * * *